United States Patent [19]

Thompson

[11] 4,090,471
[45] May 23, 1978

[54] SHORT MILK TUBE OF A MILKING MACHINE

[75] Inventor: Paul D. Thompson, Burtonsville, Md.

[73] Assignee: The United States of America as represented by the Secretary of Agriculture, Washington, D.C.

[21] Appl. No.: 734,937

[22] Filed: Oct. 22, 1976

Related U.S. Application Data

[63] Continuation-in-part of Ser. No. 589,802, Jun. 24, 1975, abandoned.

[51] Int. Cl.² .............................................. A01J 5/04
[52] U.S. Cl. .............................................. 119/14.51
[58] Field of Search .................... 119/14.47–14.54, 119/14.36, 14.44, 14.02, DIG. 1

[56] References Cited

U.S. PATENT DOCUMENTS 3,079,891  3/1963  Miller ........................... 119/14.51 X

FOREIGN PATENT DOCUMENTS 159,259  6/1957  Sweden ........................... 119/14.51

Primary Examiner—Jay N. Eskovitz
Attorney, Agent, or Firm—M. Howard Silverstein; William E. Scott; David G. McConnell

[57] ABSTRACT

The inclusion of one or more spiral lands on the interior bore of a short milk tube helps to prevent infection in any quarter from impaction of the end of the teat with milk that is caused to rush back up the tube by a combination of factors inherent in the machine milking process. The spiral lands cause the milk droplets to take on a spiral motion and be thrown out radially, thereby preventing impaction on the teat end.

7 Claims, 6 Drawing Figures

SHORT MILK TUBE OF A MILKING MACHINE

CROSS-REFERENCES TO RELATED APPLICATIONS

This application is a continuation-in-part of application Ser. No. 589,802, filed June 24, 1975, now abandoned.

BACKGROUND OF THE INVENTION

1. Field of the Invention

This invention relates to the short milk tube used with milking machines and more particularly to an improvement in the short milk tube.

2. Description of the Prior Art

It is well known that dairymen in the United States lose millions of dollars each year because of mastitis and its concomitant loss of milk production. Although mastitis was known long before milking machines were used, it is still a problem even with modern equipment. Most milk produced at present is drawn from cows by means of a milking machine rather than by hand milking. The machine operates by means of a vacuum created by an appropriately sized pump. A teat cup or metal shell with flexible inside liner or inflation is attached to each teat of the cow's udder and is held in place by vacuum. The reduced pressure inside the teat cup and the massaging action of the flexible liner are responsible for drawing milk from the udder. Milk drawn from each teat by the action of the liner flows through a smooth-bore short milk tube which connects the teat cup and liner with one of the four ferrules or nipples of the claw. The claw is equipped with a single outlet through which milk from the four short milk tubes flows to an appropriate milk collecting reservoir or system. In order to prevent milk from collecting or being held-up in the claw, the bore of the claw outlet is made large enough to handle milk from the four short milk tubes.

During this mechanical milking operation, a combination of factors inherent in the process, including vacuum level, sometimes cause a mixture of air and milk droplets to rush up the short milk tube with sufficient velocity to penetrate the teat sphicter of the cow being milked. Bacteria present in the milk droplets often cause the quarter involved to become infected.

Modifications have been made to prevent such infection. One modification was to increase the bore of the short milk tube. Another was to place a baffle above the opening of the short milk tube to deflect the droplets. However, neither of the modifications proved to be satisfactory. It is not practical to make a tube with a large enough bore to offset the distance the droplets can travel, especially at high velocities. The baffle proved unsatisfactory because it obstructed free drainage of milk from the teat cup and also interfered with cleaning operations. Consequently, a new device or a completely different type of modification was needed to cope with the problem.

SUMMARY OF THE INVENTION

An object of this invention is to provide an improvement in the short milk tube that substantially lowers the incidence of infection from milk droplets rushing up the tube.

According to this invention the above object is accomplished by modifying the interior bore of the short milk tube to include one or more spiral lands which cause or force the flow of milk/air mixtures up the tube to take on a spiral motion and throw the milk droplets out radially by centrifugal force, thereby preventing the droplets from continuing on an axial course and impacting the teat. Within the short milk tube, the centrifugal motion causes the droplets to strike the walls of the tube, thus losing much of their kinetic energy. As the upward flow leaves the short milk tube and enters the liner, the droplets which have been thrown out radially strike the walls of the liner rather than the end of the teat.

BRIEF DESCRIPTION OF DRAWINGS

Referring to the figures.

DETAILED DESCRIPTION OF INVENTION

Figure 1:
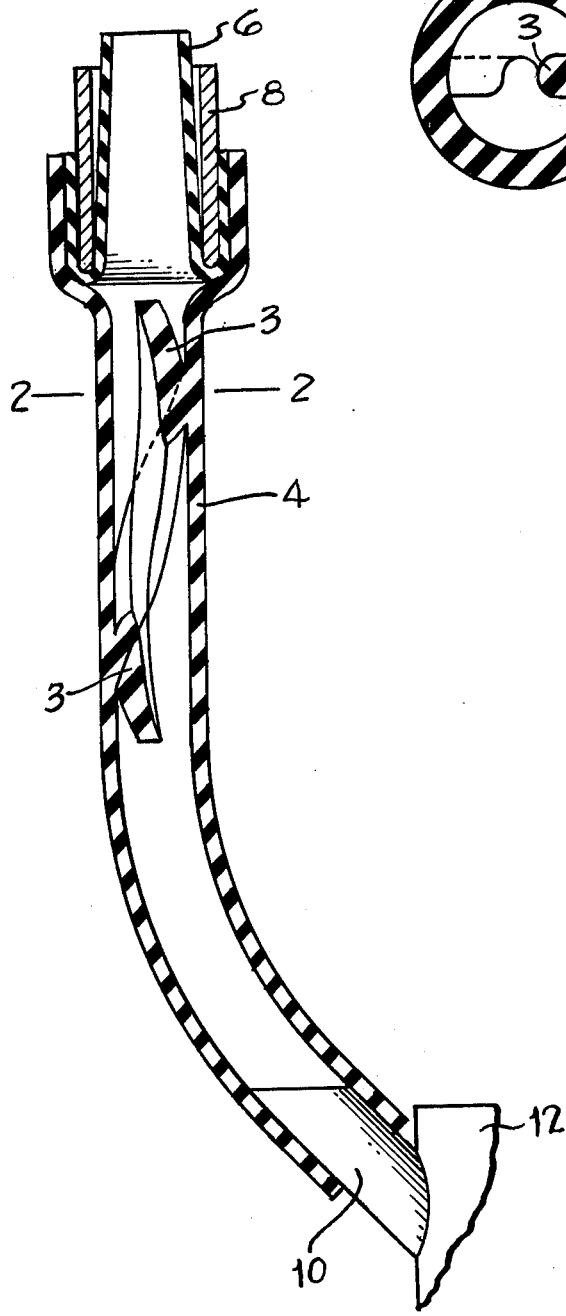
FIG. 1 is a sectional view of the interior of a short milk tube including a spiral land.
Figure 2A:
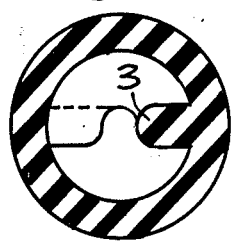
FIG. 2A is a cross section at 2—2 of FIG. 1 when the short milk tube has a single land that does not extend to the central axis of the tube.
Figure 2C:
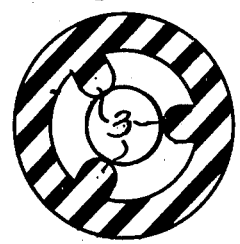
FIG. 2C is a cross section at 2—2 of FIG. 1 when the short milk tube has multiple lands.
Figure 2B:
FIG. 2B is a cross section at 2—2 of FIG. 1 when the short milk tube has a single land that extends beyond the central axis of the tube.
Figure 3A:
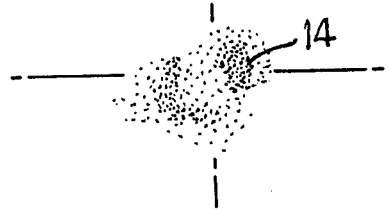
FIGS. 3A and 3B show a comparison of the patterns obtained by spraying dye droplets through an improved short milk tube of this invention and through an unimproved short milk tube.
Figure 3B:
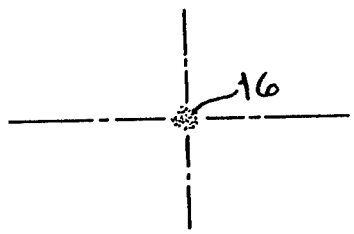

The invention as illustrated in FIG. 1 shows how a spiral land 3 is included in one type of commercially available short milk tube 4. The short milk tube 4 is used in the customary manner to join the liner or inflation 6 and shell 8 with a furrule 10 of the claw 12. Alternative arrangements of lands 3 in tube 4 are shown in FIGS. 2A, 2B and 2C. The prevention of on-axis flow by the improvement of this invention is demonstrated by comparing the patterns made when dye droplets were sprayed onto a white surface through an improved short milk tube and through an unimproved tube. The pattern 14 made by the improved tube, as seen in FIG. 3A, shows that the fluid was thrown out radially, away from the location the teat end normally occupies, whereas the pattern 16 made by a conventional tube, as seen in FIG. 3B, shows that the fluid impacted on the location the teat end normally occupies.

The improvement of this invention can be molded or machined into new milk tubes during their manufacture or they can be built-up on tubes now in use. For the purposes of this invention the spiral lands were molded onto the inner surface of an ordinary smooth-bore short milk tube. Thus, they project from the inner surface toward the central axis of the tube. However, there appears to be no reason why the smooth inner surface of an ordinary short milk tube cannot be rifled, in much the same way or a gun barrel, to form one or more appropriate spiral lands. As previously mentioned, the invention is not limited to one land or to a land in one particular area of the tube but multiple lands may be incorporated into one tube. Furthermore, one or more lands may run the full length of the short milk tube rather than being limited to a partial distance as shown in FIG. 1. The pitch of the land may also be varied and may make a complete revolution around the inner surface of the short milk tube.

I claim:

1. In a milking apparatus wherein a teat cup and liner are joined to a ferrule of the claw by a straight, flexible short milk tube, the improvement which comprises at least one spiral projection extending through at least three hundred and sixty degrees and extending inwardly from the inner surface of said short milk tube a substantial distance up to slightly more than one-half the inner diameter of said short milk tube.

2. The improvement of claim 1 wherein the distance that the spiral projection(s) extends inwardly from the inner surface of the short milk tube is less than half the inner diameter of said short milk tube.

3. The improvement of claim 1 wherein the distance that the spiral projection(s) extends inwardly from the inner surface of the short milk tube is more than half the inner diameter of said short milk tube.

4. The improvement of claim 1 consisting of one spiral projection.

5. The improvement of claim 1 consisting of plurality of spiral projections.

6. The improvement of claim 1 consisting of a spiral projection which runs the full length of the tube.

7. The improvement of claim 1 consisting of a spiral projection which runs only a partial length of the tube.

* * * * *